United States Patent [19]

Paddock

[11] 4,292,813

[45] Oct. 6, 1981

[54] ADAPTIVE TEMPERATURE CONTROL SYSTEM

[75] Inventor: Stephen W. Paddock, Evansville, Ind.

[73] Assignee: Whirlpool Corporation, Benton Harbor, Mich.

[21] Appl. No.: 18,762

[22] Filed: Mar. 8, 1979

[51] Int. Cl.³ .................. G05D 23/32; F23N 5/20
[52] U.S. Cl. .................... 62/158; 165/12; 236/46 F; 361/22
[58] Field of Search .......... 236/46 R, 46 F; 219/492; 318/599; 62/157, 158, 231; 361/22; 165/12

[56] References Cited

U.S. PATENT DOCUMENTS

| | | | |
|---|---|---|---|
| 3,421,691 | 1/1969 | Forbes | 237/8 R X |
| 3,443,121 | 5/1969 | Weisbrod | 307/117 |
| 3,487,282 | 12/1969 | Gasiorek et al. | 318/443 |
| 3,491,546 | 1/1970 | Holzer | 62/115 |
| 3,523,182 | 8/1970 | Phillips et al. | 219/501 |
| 3,545,218 | 12/1970 | Greenberg | 62/157 |
| 3,573,480 | 4/1971 | Harris | 62/158 X |
| 3,636,369 | 1/1972 | Harter | 307/141.4 |
| 3,890,798 | 6/1975 | Fujimoto et al. | 62/157 |
| 4,094,166 | 6/1978 | Jeries | 62/158 |
| 4,130,863 | 12/1978 | Schweitzer et al. | 364/105 |
| 4,132,085 | 1/1979 | Maio et al. | 62/155 |
| 4,156,350 | 5/1979 | Elliott et al. | 62/234 |

Primary Examiner—William E. Wayner
Attorney, Agent, or Firm—Wegner, Stellman, McCord, Wood & Dalton

[57] ABSTRACT

A refrigerator includes a compressor, a condenser fan, and an evaporator fan simultaneously energized by a temperature control system which includes a thermistor located to sense the average temperature of the cabinet air and a potentiometer manually adjustable to a desired temperature set point. The on or run time of the compressor and fans is controlled by the thermistor sensed temperature with respect to the set point. The duration of the run time is measured by a resettable counter. The off time is adaptively controlled within a predetermined range which minimizes energy consumption while maintaining good temperature control. An off time counter, which is used to determine the duration of the off cycle, is incremented when the measured run time is less than a desired minimum, is decremented when the measured run time is greater than a desired maximum, and maintains the prior off time when the measured run time is within a desired range.

27 Claims, 8 Drawing Figures

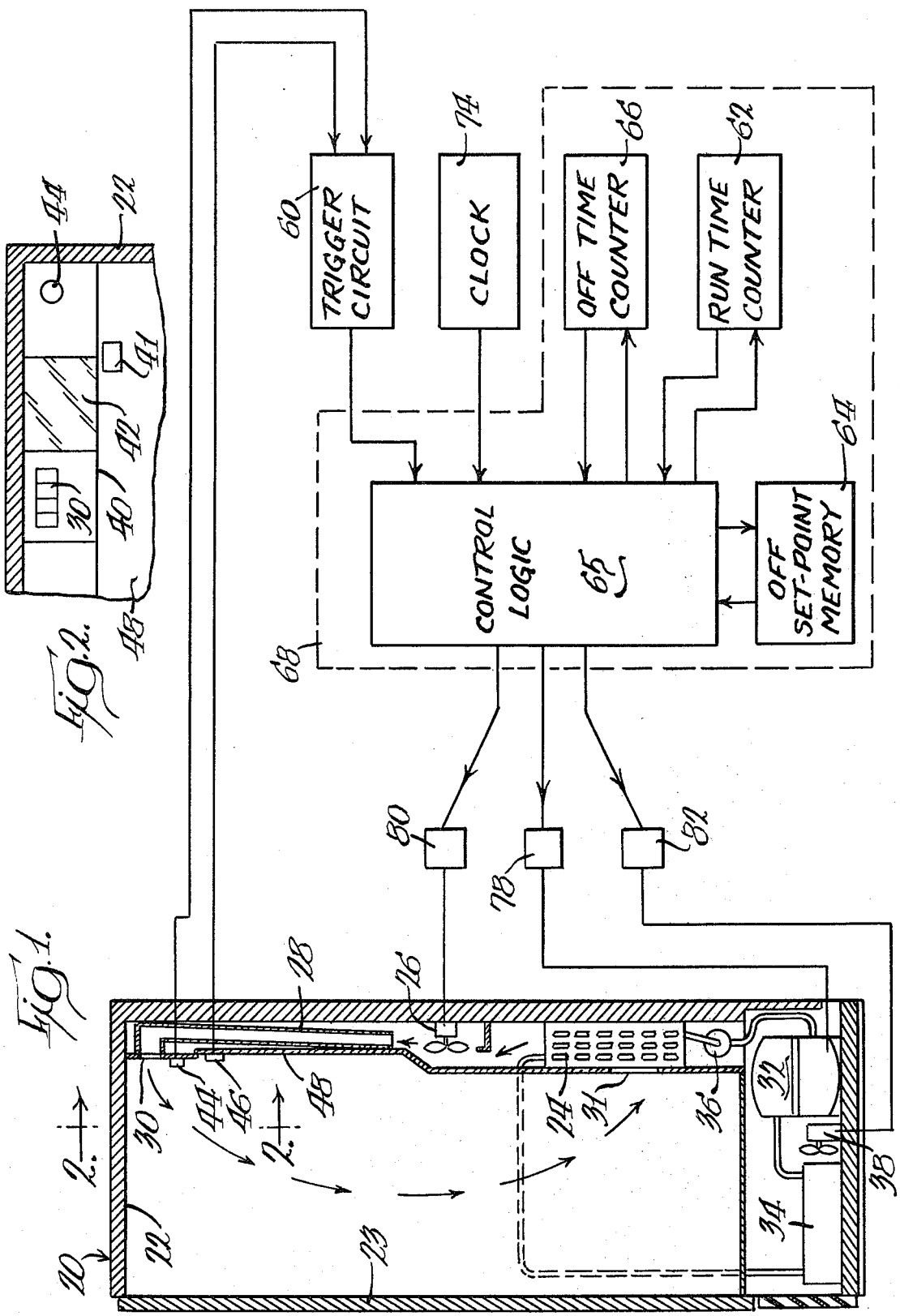

ADAPTIVE TEMPERATURE CONTROL SYSTEM

BACKGROUND OF THE INVENTION

The present invention relates to an adaptive temperature control system in which the cycle time and duty cycle of a temperature controlling device is adjusted automatically to be within a predetermined range.

In many cooling systems such as refrigerators, a thermostat is located in heat conduction relationship with a discharge air duct or the discharge air stream in order to sense discharge air temperature, thus exposing the thermostat to large temperature swings. The thermostat has a predetermined amount of hysteresis, and switches the compressor on and off in cycles which vary greatly dependent upon the operating environment of the refrigerator. Low ambient temperatures generally produce a compressor cycle having a very short run period and long off periods, which cycles may result in undesirable temperature stratification in the refrigerator. High ambient temperatures generally cause the compressor to run for very long on periods followed by very brief off periods, leading in some cases to short cycling which can cause compressor damage or overload.

The refrigerator temperature control must function at various ambient temperature and for various thermostat settings. Conventional thermostat controls have fixed set points determined by the amount of hysteresis present, and considerable design time is required to adjust the thermostat to give the desired degree of temperature regulation. The temperature that the thermostat will maintain may be dependent on other controls in the refrigerator, for example, varying the freezer damper may change the temperature in the above-freezing compartment.

It is known that long compressor cycles provide the best operating efficiency and maximum component life. Thermostats and other temperature control systems have included restart delay devices to provide a minimum off time before the compressor is restarted, and a minimum on or run time by other delay devices.

In some refrigeration control systems, a percentage timer has been used to control the compressor duty cycle, in which the timer allows manual adjustment of the run time and manual adjustment of the cycle time. This allows a user to set a preferred duty cycle and cycle time for the compressor, but does not automatically adapt these variables in response to changing conditions. Until the user intervenes, the control provides a fixed run time and a fixed cycle time.

Various temperature control systems have attempted to automatically adjust to certain changing conditions. It has been known to control the duty cycle by sensed temperature, with manual adjustment of the cycle time. In one digital control proposed for a refrigerator, the run time has been controlled by sensed temperature while a fixed off time has been provided by a counter which increments time intervals as measured by the fixed frequency of the connected power line. Of course, the widely-used thermostat system controls the on time and the off time in response to sensed temperature.

All such temperature controls have significant shortcomings. Where short cycling is prevented by providing a fixed time delay device, the control cannot fully adapt to changing ambient temperatures, heavy or minimum usage, and the like. Where fixed time delays are not provided, short cycling can occur and result in damage to the refrigerator components. These prior designs tend to be energy-inefficient in that the cycle patterns which are automatically varied are controlled only by sensed temperature. A true adaptive temperature control in which the cycle pattern and duty cycle are varied in accordance with a changing environment has not been possible.

SUMMARY OF THE INVENTION

In accordance with the present invention, the disadvantages noted above have been overcome by providing an adaptive temperature control system which automatically responds to a changing environment. A temperature sensor is located so as to sense the average temperature of the cabinet air, rather than the discharge air temperature. The run or on time of the compressor and related apparatus is controlled by the sensed temperature. The off time of the compressor is adaptively controlled by circuit means responsive to both the previous run time and the last off time. The run time is measured and, when less than a desired lower limit, the last stored off time is incremented so as to expand the next off time and hence the cycle time, thereby preventing short cycling while improving energy efficiency. When the measured run time is greater than a desired upper limit, the stored off time is decremented so as to reduce the next off time and hence the cycle time, causing the next run time for the compressor to be shorter. This reduces temperature stratification which can occur during long periods when the compressor is off.

The present invention provides both minimum and maximum off times for the compressor, while forcing the compressor to run within a predetermined range which minimizes deleterious effects while improving energy efficiency. In preferred form, the compressor off time is incremented at a greater rate than it is decremented, forcing the overall compressor cycle to the upper portion of its range, resulting in a more energy-efficient operation, while also minimizing hunting to allow the control system to reach a steady state operation more rapidly.

While the adaptive temperature control system will be disclosed with respect to a refrigerator, it will be appreciated that the temperature control system is adaptable for use in various cooling systems or heating systems in which desired temperatures are to be maintained by means of a periodically energized device.

Although the control disclosed in the preferred embodiment adjusts the off time of a device as a function of the previous run time and previous off time, it will be appreciated that many variations of this basic technique are comprehended within the scope of the invention. For example, it may be desirable in some applications to measure the off time of a device and adjust the run time. Similarly, it may be desirable to measure the duty cycle or cycle length, or the length of several cycles before an adjustment in the off time or on time is effected.

One object of the present invention is the provision of a temperature control system in which the run time and off time of a temperature controlling device are adaptively controlled in accordance with temperature and the previous run time and off time. In a preferred form, the off time is automatically varied as a function of previous run time and the previous off time, so as to force the device into a preferred range of operation. The control system thus permits the sometimes competing considerations of maximum energy efficiency and minimum temperature fluctuation to be balanced in a controlled, more optimum manner than is practical in conventional systems.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 shows a side plan view of a refrigerator and a generalized block diagram of the adaptive temperature control system therefor;

FIG. 2 is a front plan view showing the location of the temperature sensor within the refrigerator cabinet, taken along lines 2—2 of FIG. 1;

DESCRIPTION OF THE PREFERRED EMBODIMENT

Figure 3A:
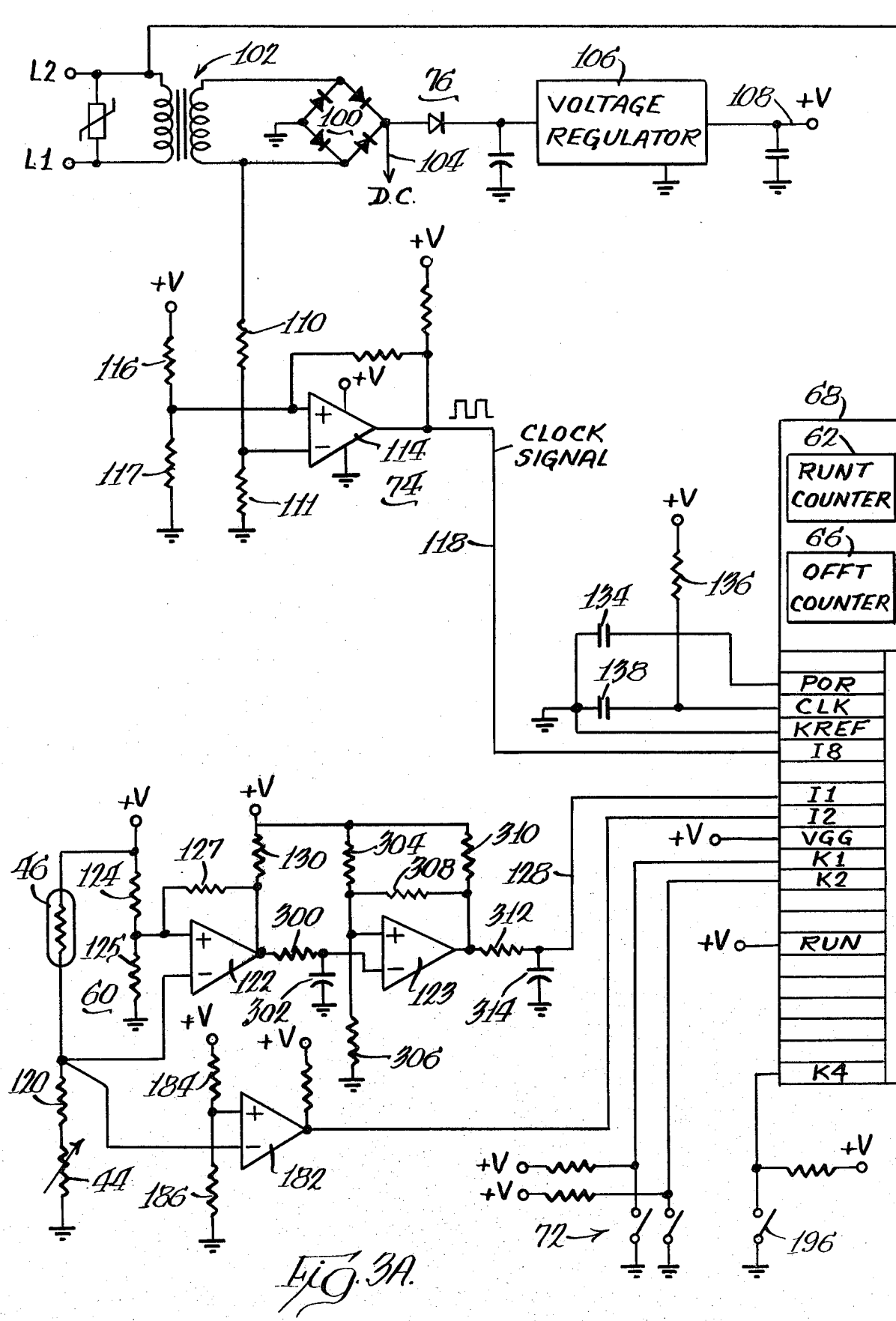
FIGS. 3A and 3B comprise a single schematic diagram, when jointed along the dashed lines, of a microcomputer based embodiment of the adaptive temperature control system.

Turning to FIG. 1, a conventional domestic refrigerator 20 is illustrated in conjunction with the unique adaptive control system. The refrigerator 20 includes a cabinet 22, which may define a plurality of refrigerated compartments, cooled by a forced-air refrigeration system. A hinged door 23 provides access to the cabinet. Air is refrigerated as a result of being passed in heat-exchange relationship with an evaporator 24 and is forced by an evaporator fan 26 through a discharge air duct 28 to an outlet grill 30 into the refrigerated compartment. Return air is circulated through a grill inlet 31 to the evaporator 24. The refrigeration apparatus includes a conventional compressor 32, condenser 34, and accumulator or header 36, interconnected through tubing to the evaporator 24 to effect the flow of refrigerant thereto. A condenser fan 38 circulates air through the condenser 34, and may be energized concurrently with the compressor 32 and evaporator fan 26.

As seen in FIG. 2, a control panel 40, which mounts the discharge air grill 30, includes a translucent panel 42 behind which an electric light is located for illuminating the cabinet. The panel 40 also mounts a manually adjustable potentiometer 44 by which the user can select the set point or desired temperature of the refrigerated compartment. A temperature sensor 46, such as a thermistor, is mounted on the upper portion of the rear panel 48, just below the control panel 40, to be exposed to a temperature which is representative of the average temperature of the refrigerated cabinet air. This location is preferred when using a thermistor or other analog temperature sensing device which has little or no hysteresis, as opposed to being located in heat transfer relationship with the discharge air duct 28 so as to monitor discharge air temperature.

The adaptive temperature control system, which includes the thermistor 46 and potentiometer 44, is shown in block diagram form in FIG. 1. The thermistor 46 and potentiometer 44 are connected to a trigger circuit 60 which operates to provide a digital output indicating whether the sensed temperature is above or below the set point. The time duration of the "on" or "run" time for the compressor 32 and the fans 26 and 38 are determined by the trigger circuit 60 which in turn is responsive to the temperature sensed by the thermistor 46. A resettable run time (RUNT) counter 62 records the actual run time during which the compressor 32 and fans 26 and 38 are energized.

The off portion of the cycle, during which the compressor 32 and fans 26 and 38 are not energized, is determined by an off set point (OFFSP) memory or storage register 64. Memory 64 contains a count which is automatically varied as a function of the previous off time and the previous run time by control logic 65. This count stored in memory 64 represents the time in seconds for the current "off" portion of the cycle. A resettable off time (OFFT) counter 66 keeps a running count of the duration of the off cycle. Assuming that the trigger circuit 60 indicates that cooling is required, when the count accumulated in counter 66 reaches the time count contained in the memory 64, the control logic 65 energizes the compressor and fans. Timing signals are provided to the various circuits by a clock circuit 74.

The counters 62, 66, the memory 64 and the control logic 65 may be implemented using digital logic or through the use of a microcomputer. In the preferred embodiment illustrated, a single chip microcomputer is used to implement the circuitry 68 shown within dashed lines in FIG. 1. Thus, the counters 62, 66 and the resettable memory 64 are implemented in random access memory, or RAM, which is located on the chip and is under the control of a central processing unit, or CPU, also located on the chip. The control logic 65 is implemented in read-only memory, or ROM, which also contains the control program and constants for the system.

The outputs of the integrated circuit 68 are connected to a compressor driver 78 which energizes the winding of the compressor motor 32. A fan driver 80 provides energization for the evaporator fan 26, and a fan driver 82 provides energization for the condenser fan 38. The drivers 78, 80, and 82 include appropriate power switching means for selectively connecting a power source (not shown) to the compressor and fans.

Figure 3B:
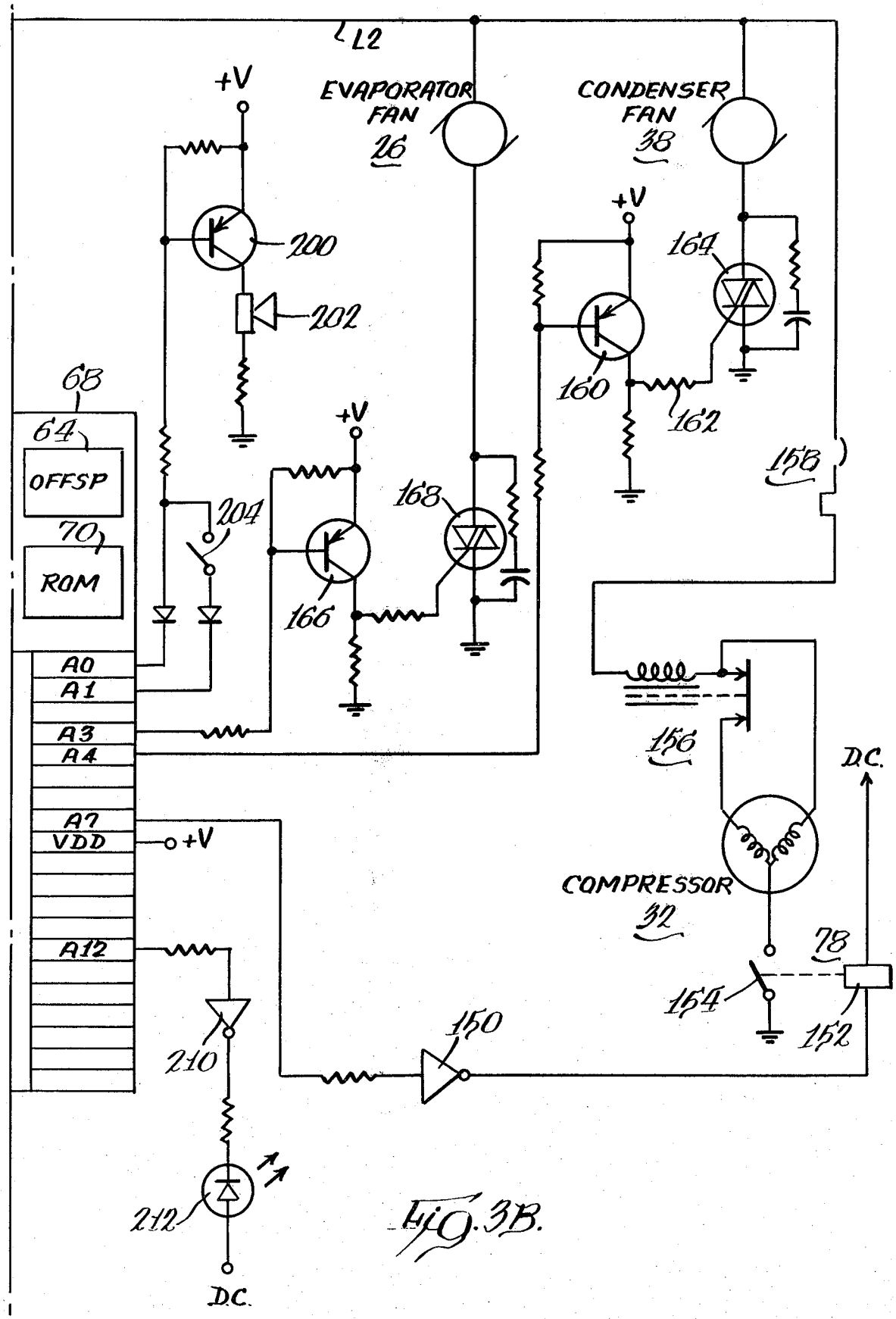

In FIGS. 3A and 3B, the circuit of the adaptive temperature control system, shown in block form in FIG. 1, is illustrated in detail. The power supply 76, FIG. 3A, includes diodes 100 connected as a full wave rectifier across the secondary winding of a transformer 102 having its primary winding coupled across standard 60 hertz line voltage, designated by L1 and L2. The output from the full wave diode rectifiers 100, on a line 104, comprises unregulated direct current for the control system and is designated DC. The unregulated DC is also coupled to a voltage regulator 106 to produce, on an output line 108, a source of regulated direct current such as positive 8.5 volts, designated +V.

The secondary of transformer 102 is also coupled to the clock circuit 74 through a pair of resistors 110, 111 which form a voltage divider, the center of which is coupled to a negative input of a comparator 114. The positive input of the comparator is coupled to a fixed DC reference provided by a pair of voltage divider resistors 116, 117, so as to produce an output clock signal on an output clock line 118 having uniform time increments such as 60 pulses per second. The clock signal is provided to an input I8 of the integrated circuit 68.

The trigger circuit 60, FIG. 3A, includes the thermistor 46, which may be the negative temperature coefficient type, and the potentiometer 44 connected in series between +V and a source of reference potential or ground. A fixed resistor 120 sets the range of the potentiometer control. The junction between thermistor 46 and resistor 120 is coupled to the negative input of a comparator 122, the positive input of which is connected to the junction of voltage divider resistors 124, 125 which provide a reference voltage. A stabilization resistor 127 is coupled from the positive input of comparator 122 to the output line 128 thereof, and is also coupled through a pull-up resistor 130 to +V.

The output of comparator 122 is coupled to the negative input of a second comparator 123 by means of an R-C filter, or integrator, comprising resistor 300 and capacitor 302. Resistors 304 and 306 form a voltage divider which is connected to the positive input of comparator 123. The output of comparator 123 is coupled back to its positive input by stabilization resistor 308 and to the +V source by pull-up resistor 310. The output signal from comparator 123 is passed through a high frequency filter comprising resistor 312 and capacitor 314 and is coupled by line 128 to input I1 of the integrated circuit 68.

To maximize noise immunity and minimize chatter which can occur as the resistance of thermistor 46 slowly changes through the trip region, it has been found desirable to select a value for resistor 127 which provides a small amount of hysteresis for comparator 122 and at the same time select a value for resistor 308 which provides a relatively large amount of hysteresis for comparator 123. It is also desirable that the time constant of the R-C filter formed by resistor 300 and capacitor 302 be rather large, for example 2 or 3 seconds.

For a detailed description of the operation of the above-described temperature sensing circuitry, reference should be made to the co-pending application of Stephen Paddock and Andrew Tershak, Ser. No. 68,473, filed Aug. 20, 1979, and entitled Temperature Sensing Circuit With High Noise Immunity. Briefly, when the temperature sensed by thermistor 46 rises above the set point controlled by potentiometer 44, the output of comparator 123 will change to a low state, indicating that cooling is required. Conversely, a temperature below the set point produces a high output on line 128, indicating that no cooling is required. While a specific trigger circuit has been illustrated, it will be appreciated that various analog-to-digital converters could be connected between an analog temperature sensor and the input I1 of the integrated circuit 68.

Door switches 72 are provided for each door, such as a refrigerator door and a freezer door, and when closed, connect inputs K1 and Ks of circuit 68 to ground.

Input POR of circuit 68 is coupled through a power-on reset capacitor 134 to ground. Input CLK for clock is coupled through a resistor 136 to +V and through a capacitor 138 to ground. The resistor 136 and capacitor 138 set the internal oscillator of the integrated circuit 68 to approximately 1.0 megahertz. Inputs VGG and RUN connect directly to +V.

The microcomputer integrated circuit 68 may be a conventional, single-chip device, and may include, on the chip, a 1,024×8 bit program ROM 70 and a 64×4 bit scratch pad RAM. The RAM is allocated to form the counters 62 and 66 and the OFFSP memory 64. The microcomputer has an internal seconds timers for the power line in order to automatically compute elapsed seconds, based on the clock signal provided on line 118.

The input lines on circuit 68 labeled K serve as normal logic inputs. The inputs labeled I have internal pull-up for interfacing to switches. The output lines labeled A0 through A3 can sink 25 milliamps at 0.6 volts sink output. Any combination of I inputs together or K inputs together can be sent simultaneously.

By way of example, the microcomputer integrated circuit 68 may be an S2000 microcomputer manufactured by American Microsystems, Inc. (AMI). In the illustrated circuit, approximately 250 words of ROM are utilized for the control program, illustrated in FIG. 4, and for the constants, all described later. Approximately 10 words of RAM are used for the counters 62 and 66 and the memory 64. While a microcomputer with on-chip memory has been utilized, it will be appreciated that the counters 62, 66 and the storage register 64 can be implemented in separate memory or in hardware circuits, and the remaining portions can be implemented by discrete logic circuitry if so desired.

As seen in FIG. 3B, the A7 output of circuit 68 is coupled through a driver 150 to a relay 152. The relay controls a switch 154 which connects the windings of the compressor motor 32 through a conventional start relay 156 and a conventional overload protector 158 to line L2 connected to the primary of the power supply transformer 102.

The A4 output drives the base of transistor 160 having a collector coupled through a resistor 162 to a triac 164 which gates AC on line L2 to the condenser fan motor 38. The evaporator fan motor 26 is connected in a similar circuit to the A3 output, which drives a transistor 166 and connected triac 168 in order to energize the fan motor.

While the circuits described generally above, along with the control program to be described, are sufficient to implement the adaptive temperature control system, additional functions may be implemented as desired. By way of example, some additional functions which can readily be implemented, using the microcomputer when appropriately programmed, will now be described.

As seen in FIG. 3A, the sensor trigger circuit 60 may include an over-temperature circuit 180 having a comparator 182 coupled to a reference voltage provided by a pair of voltage dividing resistors 184, 186. When the temperature sensed by the thermistor 46 exceeds a reference, the comparator provides a step signal to the I2 input of circuit 68. This may be used to energize an alarm whenever the temperature within the refrigerated compartment reaches an abnormally high level as set by the resistors 184, 186, such as a temperature resulting from a complete compressor failure, or where the refrigerator door has been left ajar for an extended period.

The refrigerator may include a message switch 196 which is activated by the user whenever the user wishes to enable a special "message" light provided on the refrigerator.

To provide a brief, audible signal each time one of the refrigerator doors is opened or closed, as sensed by switches 72, a transistor 200 (FIG. 3B) having its base coupled to the output A0 drives an audible indicator 202. A switch 204 may be provided to allow the user to manually disable the audible door signal.

A typical indicator for visually warning the user of an alarm type condition is shown in FIG. 3B. The output A12 is coupled through a driver 210 to a light emitting diode or LED 212, to provide a visual indication of the condition which is to be signaled to a user. Similar circuits may be connected to other A outputs which are to signal conditions such as activation of the message switch, the over-temperature circuit, the doors ajar circuit or the like.

Figure 4:
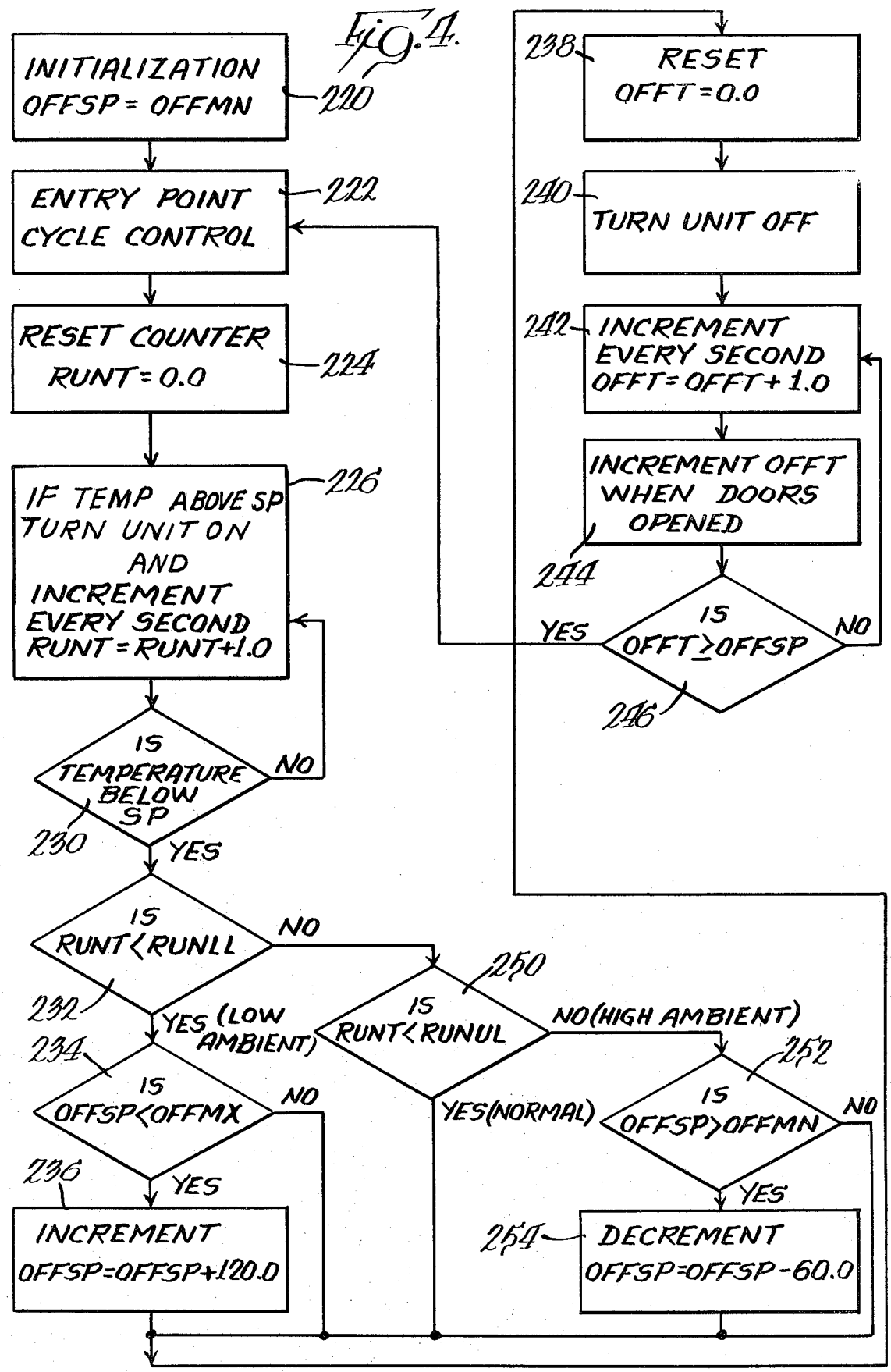
FIG. 4 is a flow chart of the control program for the adaptive temperature control system.

The flow chart of the program which is stored in the ROM 70 is shown in FIG. 4. During initialization, the OFFSP memory 64, FIG. 3B, is set by a block 220 to a minimum off time, OFFMN, constant such as 300 seconds. The OFFMN constant is stored in the ROM along with a maximum off time, OFFMX, constant which may be 1800 seconds. Also stored in the ROM is a desired compressor run time lower limit or RUNLL, constant such as 1200 seconds, and a desired run time upper limit, RUNUL, constant such as 1800 seconds.

After initialization, block 222 provides entry to the cycle control, in which a block 224 resets the RUNT counter 62 to zero. A block 226 then turns the unit on, by enabling the output A3, A4 and A7 in FIG. 3B so as to energize the evaporator fan 26, the condenser fan 38 and the compressor motor 32. At the start of the run portion of the cycle, the block 226 now increments the RUNT counter 62 every second so that the counter maintains a running count of the seconds elapsed since block 226 enabled the compressor and fans.

The unit stays on until the temperature cools below the set point. In particular, a decision block 230 determines from the input I1 whether the temperature sensed by the thermistor 46 is below the set point established by the potentiometer 44. A no decision returns control to block 228, and the system stays in this loop until the sensed temperature falls below the set point of the sensor, with the RUNT counter incrementing every second.

When the sensed temperature falls below the set point, block 230 passes control to a decision block 232 which compares the seconds count, now held in the RUNT counter, with the stored constant RUNLL, representing the desired lower limit of compressor run time. If the count stored in the RUNT counter is less than RUNLL, indicating that the compressor operated for less than the desired minimum interval, control then passes to decision block 234. Block 234 determines whether the number in the OFFSP memory 64 is less than the stored constant OFFMX, herein 1800 seconds, which represents the maximum off time for the compressor. Assuming this is the first run through the control loop, the OFFSP memory contains 300 seconds, as set initially by block 220. Control therefore passes to a block 236 which increments the OFFSP memory by 120 seconds. A block 238 now resets the OFFT counter 66 to zero, after which a block 240 changes the state of the A3, A4 and A7 output so as to deenergize the compressor motor and fans.

Upon deenergization, block 242 increments the OFFT counter 66 every second so as to maintain a running count of the number of seconds which have elapsed since the unit was turned off. A block 244, which is optional, is responsive to the K-1 and K-2 inputs to increment the OFFT counter by some additional amount whenever a door opening occurs during the off portion of the cycle. Decision block 246 then determines whether the off time, as stored in the OFFT counter 66, has equaled or exceeded the off time set point stored in the OFFSP memory. In the present example, the OFFSP memory stores the number 420, as set by block 236. This loop continues, with the unit remaining off, until the elapsed time in the OFFT counter 66 equals the stored off time in the OFFSP memory 64. Block 242 then returns control to the entry point 222 of the cycle control. During this pass through the control program, one compressor cycle has occurred, that is, one on portion and one off portion of a compressor operating cycle have taken place. The next cycle is now controlled in a similar manner.

Returning to the run section of the control program, if the run time has been greater than the desired lower limit RUNLL at the time the temperature fell below the set point, control would have passed from decision block 232 to a decision block 250, which determines whether the run time is less than the desired upper limit RUNUL, herein 1800 seconds. If less, the run time duration is within the desired range, and control immediately passes to the reset block 238. If greater, control passes to a decision block 252 which determines whether the count in the OFFSP memory is greater than the minimum stored constant OFFMN, herein 300 seconds. If greater, control passes to block 254 which decrements the count in the OFFSP memory by 60 seconds.

If the OFFSP memory already contains the minimum off time number, control immediately passes to reset block 238.

Figure 5:
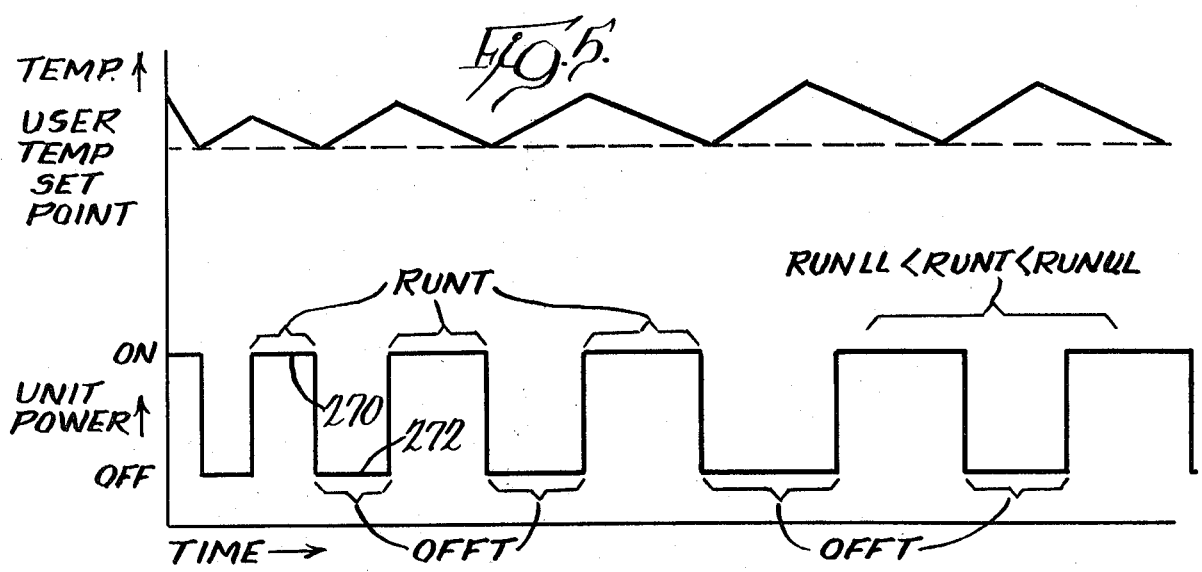
FIG. 5 illustrates waveform diagrams (not to scale) of the sensed temperature of the cabinet air and the duty cycle of the compressor for a typical ambient temperature condition.
Figure 6:
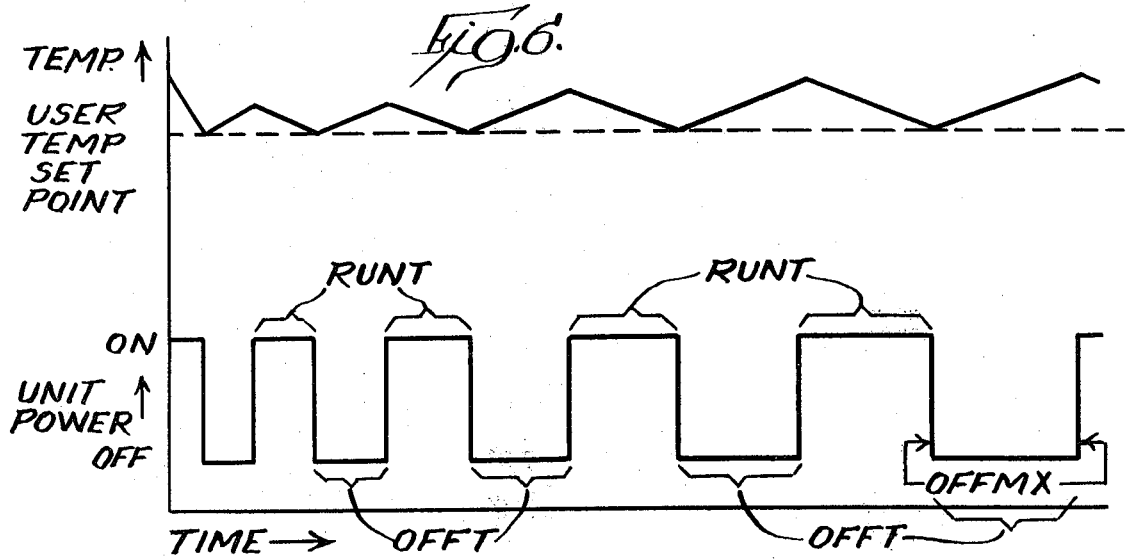
FIG. 6 illustrates waveform diagrams (not to scale) of the sensed temperature of the cabinet air and the compressor duty cycle for a low-temperature ambient condition.
Figure 7:
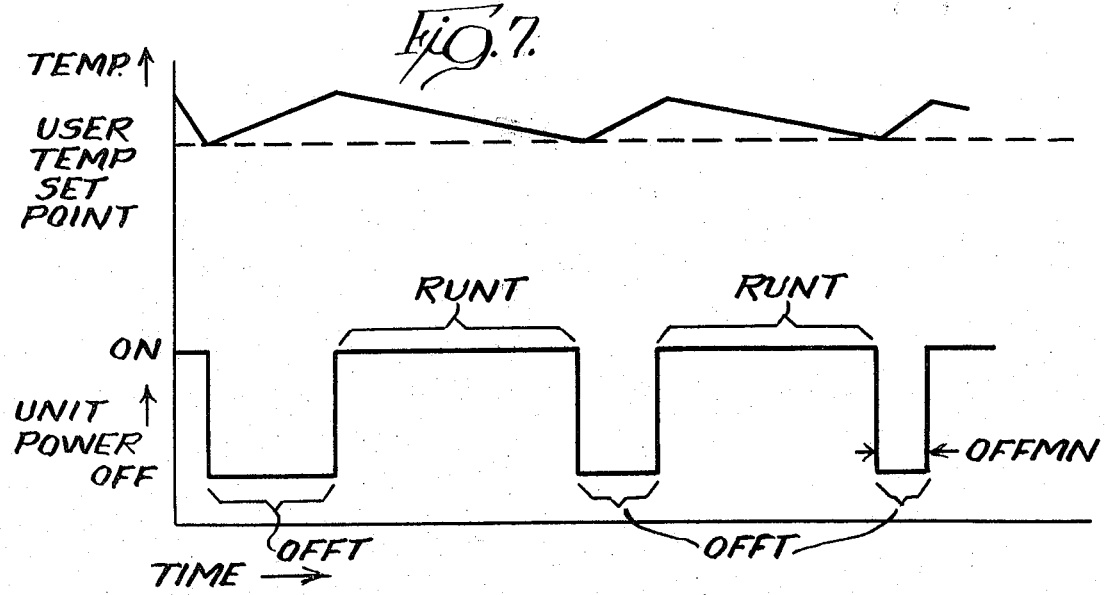
FIG. 7 illustrates waveform diagrams (not to scale) of the sensed temperature of the cabinet air and the compressor duty cycle for a high-temperature ambient condition.

The resulting control over the run time and off time of the compressor and fans is illustrated by the waveform diagrams shown in FIGS. 5-7 (not to scale between different figures). The upper portion of each figure illustrates the temperature sensed by thermistor 46 with respect to the set point established by manual adjustment of the potentiometer 44. The lower waveform in each figure represents several cycles of energization and deenergization of the compressor. The on or run time of the compressor is labeled RUNT, while the off time is labeled OFFT.

FIG. 5 illustrates the progression of representative refrigerator cycles for a typical ambient temperature condition which is neither excessively hot nor cold. As the sensed temperature falls below the set point, the unit is turned off. Assuming that the refrigerator has just been started and had run for greater than 20 minutes but less than 30 minutes, the control blocks 242, 244 and 246 would maintain the unit off until the off time equaled the initialization time of 300 seconds, i.e. 5 minutes. This is true regardless of the state of the temperature sensing means. After being held off for 5 minutes and assuming that the sensed temperature has risen above the set point, the unit now turns on and remains on until the sensed temperature again falls below the set point. The resulting run time RUNT, as indicated by the on portion 270 in FIG. 5, typically would be fairly short now that the refrigerated cabinet space is approximately at the desired temperature. Therefore, the next off time 272 will be incremented so as to equal the previous off time plus 120 seconds. Since the new off time is greater, the temperature within the cabinet space will rise slightly higher, thereby causing the next run time to be greater in order to cool the temperature down to the set point. Thus, each lengthening of the off time forces an increase in the next run time, and this continues until the run time is brought within the desired range, from which point the off time will be held constant. The time duration of a single cycle is thus lengthened, and forced to an energy efficient operation as compared with the initial cycles which required more frequent energization, for short durations of time.

The run time lower limit, RUNLL, and the run time upper limit, RUNUL, represent desired values which will not always be reached.

The case of a low ambient temperature condition for the refrigerator is illustrated in FIG. 6. The off time is incremented 120 seconds per cycle to try and force the run time above the desired lower limit. For a very cool ambient temperature environment, a relatively short run time may be all that is necessary and the compressor run time may not reach the desired lower limit RUNLL. In this situation, the off time OFFT eventually reaches the maximum condition, OFFMX, and is not incremented any further.

The case of a high ambient temperature environment is illustrated in FIG. 7. The compressor and fans are run for long on periods resulting in extremely long run times RUNT. Each time the temperature falls below the set point, the off time will be decremented by 60 seconds. Since the off time is shortened, the temperature within the cabinet increases less, and thus the next run time RUNT is shorter. However, because of the high ambient temperatures, the run time may never be forced to less than the desired upper limit, RUNUL, so the off time will continue to decrement to its minimum value, OFFMN. Decrementing to less than this minimum value is not permitted in that a minimum off time must elapse before the compressor can be safely reenergized.

As the ambient temperature varies, and in accordance with the internal loading of the refrigerator and other factors, the adaptive temperature control system will adjust the off time in the manner described above, and thus cause a change in the next on time, so as to optimize the refrigerator operation by minimizing short cycling and maximizing the cycle period within a desired range.

Having described the invention, the embodiments of the invention in which an exclusive property or privilege is claimed are defined as follows:

1. A temperature control system for a heating or cooling device, comprising:
    a temperature sensor for monitoring the temperature of a space;
    means for repeatedly operating the device in cycles, each cycle having an on portion during which the device is energized and an off portion during which the device is deenergized;
    means coupled to the temperature sensor for controlling the duration of one of the repeated portions of the cycle in accordance with the sensed temperature;
    measurement means for measuring the temperature controlled portions of the cycle;
    means operative during the normal cyclic operation of the device for varying the duration of the repeated other portion of the cycle in response to the measurement of at least one of the temperature controlled portions of the cycle.

2. A temperature control system for a heating or cooling device, comprising:
    a temperature sensor for monitoring the temperature of a space;
    means for repeatedly cycling the device through on portions during which the device is energized and off portions during which the device is deenergized;
    means coupled to the temperature sensor for controlling the duration of one of the repeated portions of the cycle in accordance with the sensed temperature; and
    means for varying the duration of the repeated other portion of the cycle in response to the time duration of at least one of the temperature controlled portions of the cycle, including time measurement means for measuring the time duration of the temperature controlled portions of the cycle, and means for resetting the time measurement means after each cycle so that the last temperature controlled portion of the cycle varies the duration of the next portion of the cycle.

3. A temperature control system for a heating or cooling device, comprising:
    a temperature sensor for monitoring the temperature of a space;
    means for repeatedly cycling the device through on portions during which the device is energized and off portions during which the device is de-energized;
    means coupled to the temperature sensor for controlling the duration of one of the repeated portions of the cycle in accordance with the sensed temperature; and
    means for varying the duration of the repeated other portion of the cycle in response to the time duration of at least one of the temperature controlled portions of the cycle, including time measurement means for measuring the time duration of the temperature controlled portions of the cycle, a memory for storing the time duration of the prior other portion of the cycle, means for incrementing or decrementing the memory by fixed amounts in accordance with the measured time duration of the temperature controlled cycle portion, and means for terminating said other portion of the cycle under control of said memory means.

4. The temperature control system of claim 3, including limit means for establishing a time limit for the other portions of the cycle, and means responsive to the limit means for preventing further incrementing or decrementing of the memory when the duration of the other cycle portion reaches a limit value.

5. A temperature control system for a heating or cooling device comprising:
    a clock circuit for generating clock pulses representing time increments; and,
    control means for repeatedly energizing and deenergizing the device with a variable cycle duration, the control means including a resettable counter for counting the clock pulses to measure time durations, means for repeatedly enabling the counter at a predetermined point in each cycle to record elapsed time for a first portion of the cycle, means for automatically terminating the first portion of the cycle when the counter contains a predetermined count, and adjustment means for automatically varying the predetermined count for the counter in response to a sensed condition.

6. The temperature control system of claim 5 including a second resettable counter for counting the clock pulses to meausre time durations, means for repeatedly enabling the second counter at a different point in each cycle, and wherein the adjustment means is responsive to the time duration measured by the second counter for varying the predetermined count.

7. The temperature control system of claim 5 wherein the adjustment means increments the predetermined count when the sensed condition is to one side of a desired range and decrements the count when the sensed condition is to the other side of the desired range.

8. The temperature control system of claim 7 wherein the amount by which the count is incremented is different than the amount by which the count is decremented.

9. A temperature control system for a heating or cooling device comprising:
a temperature sensor for sensing the temperature of a space,
an adjustable device for setting a desired temperature for the space,
a clock circuit for generating clock pulses representing time increments, and
control means responsive to the sensor and the adjustable device for repeatedly energizing and deenergizing the heating or cooling device with a variable cycle including a resettable counter for counting the clock pulses to measure time durations, means for repeatedly enabling the counter at a predetermined point in each cycle to record elapsed time for the deenergized portion of the cycle, means for automatically terminating the deenergized portion of the cycle when the counter contains a predetermined count, and adjustment means for automatically varying the predetermined count for the counter when the time duration of the energized portion of the cycle does not fall within a desired range.

10. The temperature control system of claim 9 wherein the adjustment means includes means for maintaining the last predetermined count when the time duration of the energization portion of the cycle is within a desired range of values.

11. A temperature control system for a refrigeration apparatus including a compressor energizable to effect cooling of a refrigerated space, comprising:
a temperature sensor for sensing the temperature of the refrigerated space;
power switching means for energizing the compressor to thereby reduce the temperature of the refrigerated space to a predetermined level at which time energization is ceased; and
electronic control means connected to said power switching means for preventing reenergization of the compressor for a controllable off period, said control means including first storage means for storing a measure of the previous off period, second storage means for storing a measure of the previous run period, and means for varying the next off period based on the stored measure of said previous off period and the stored measure of the previous run period.

12. The temperature control system of claim 11 wherein the means for varying includes lower limit means responsive when the stored means of the run period is less than a desired lower limit for incrementing the next off period to thereby increase the duration of the next run period.

13. The temperature control system of claim 11 wherein the means for varying includes upper limit means responsive when the stored measure of the run period is greater than a desired upper limit for decrementing the next off period to thereby reduce the duration of the next run period.

14. The temperature control system of claim 11 wherein the electronic control means includes limit means for establishing a limit to the off period, and the means for varying includes means for incrementing or decrementing the off period by predetermined amounts for each compressor cycle until the limit is reached.

15. The temperature control system of claim 14 wherein the off period is incremented by fixed amounts which are greater than the fixed amounts by which it is decremented.

16. The temperature control system of claim 11 including a manually adjustable device for adjusting the temperature set point for the refrigerated space, the electronic control means being responsive to the sensor to maintain energization of the compressor until the sensed temperature falls below the set point.

17. The temperature control system of claim 11 wherein the refrigeration apparatus includes a refrigerated compartment having an outlet for refrigerated air, a discharge air duct leading from an evaporator to the outlet, the compressor effecting the flow of refrigerant to the evaporator, and the temperature sensor being located within the refrigerated compartment and spaced from the outlet to sense substantially the average temperature of the refrigerated compartment.

18. The temperature control system of claim 11 wherein the refrigeration apparatus includes a refrigerated compartment having a door, a door switch located for indicating when the door is open, and wherein the electronic control means decrements the next off period in response to actuation of the door switch.

19. A control system for controlling the level of a sensed variable which is responsive to the operation of a periodically energized device, comprising:
means for measuring the duty cycle of the periodically energized device; and,
means for automatically varying the duty cycle of the periodically energized device toward a predetermined desired operating range.

20. A control system for controlling the temperature of a space, said space temperature being responsive to the operation of a periodically energized device, comprising:
means for sensing the temperature of said space;
means responsive to said temperature sensing means for controlling the duration of a first portion of the duty cycle of said periodically energized device;
timing means for measuring the time duration of at least a preselected portion of the duty cycle of said periodically energized device; and
means operative during each duty cycle for automatically varying the time duration of the duty cycle in response to the timing means, including means for automatically varying a second portion of the duty cycle of said periodically energized device in response to the measured portion of the duty cycle.

21. A method of controlling the temperature of a refrigerated space in a refrigerator having a compressor operated in cycles, each cycle having an off time and a run time which is thermostatically controlled in response to the sensed temperature of said refrigerated space, comprising the steps of:
measuring the run time of each cycle; and
varying the off time of each cycle as a function of the measured run time.

22. A method of controlling refrigeration means which is operated in cycles to control the temperature of a refrigerated space, said method comprising the steps of:
(a) energizing said refrigeration means to initiate a duty cycle thereof in order to effect cooling of said refrigerated space;
(b) sensing the operating time required for said refrigeration means to reduce the temperature within said refrigerated space to a predetermined level;
(c) deenergizing said refrigeration means when said predetermined temperature level is reached;
(d) preventing reenergization of said refrigeration means for a period of time which is functionally related to said sensed operating time so as to vary the time duration of said duty cycle; and
(e) continuously repeating steps (a) through (e).

23. In a refrigeration apparatus including a compressor for effecting the flow of refrigerant to an evaporator which is in heat exchange association with a refrigerated space, a method of controlling said compressor comprising:
(a) energizing said compressor to effect cooling of said refrigerated space;
(b) sensing the compressor run time required to reduce the temperature of said refrigerated space to a predetermined level;
(c) deenergizing said compressor when said predetermined level is reached;
(d) preventing reenergization of said compressor for a period of time which is longer than its previous deenergized period when said sensed compressor run time is less than a first predetermined interval and shorter than its previous off period when said sensed compressor run time is greater than a second predetermined interval; and
(e) continuously repeating steps (a) through (e).

24. A method of operating a refrigeration apparatus including a compressor to control the temperature of a refrigerated space, comprising:
(a) energizing said compressor to effect cooling of said refrigerated space;
(b) storing a signal indicative of the compressor run time required to reduce the sensed temperature to a preselected level;
(c) deenergizing said compressor when said preselected sensed temperature level is reached;
(d) preventing reenergization of said compressor for a period of off time which is determined by said stored run time signal;
(e) reenergizing said compressor when said sensed temperature rises above said reselected level and said compressor off period has elapsed; and
(f) repeating steps (b) through (f).

25. A temperature control system for a refrigeration apparatus including a compressor energizable to effect cooling of a refrigerated space, comprising:
temperature sensing means arranged to sense the temperature of said refrigerated space; and
control means for controlling the energization of said compressor, including means responsive to said temperature sensing means for controlling the run time of said compressor, means for measuring the run time of said compressor, means for comparing said measured run time with a desired run time limit, and means for preventing reenergization of said compressor for a controllable period having a length based on the comparison of said measured run time with said desired run time limit.

26. A temperature control system for a refrigeration apparatus including a compressor energizable to effect cooling of a refrigerated space, comprising:
temperature sensing means arranged to sense the temperature of said refrigerated space; and
control means for controlling the energization of said compressor, including means responsive to said temperature sensing means for controlling the run time of said compressor, means for storing a measure of the compressor run time, means for comparing said stored measure of compressor run time with a desired range of compressor run times, and means responsive to said comparing means for preventing reenergization of said compressor for a controllable period having a length determined by the comparison of said stored measure of compressor run time with said desired range of compressor run times.

27. A temperature control system for a refrigeration apparatus including a compressor energizable to effect cooling of a refrigerated space, comprising:
temperature sensing means arranged to sense the temperature of said refrigerated space; and
control means for controlling the energization of said compressor, including means for comparing the compressor run time with a desired range of compressor run times, means responsive to said run time comparison means for comparing the previous compressor off period with a desired range of compressor off periods when the compressor run time does not fall within said desired range of compressor run times, and means for preventing reenergization of said compressor for a controllable period having a length that is a function of the run time and off time comparisons.

* * * * *

UNITED STATES PATENT AND TRADEMARK OFFICE
CERTIFICATE OF CORRECTION

PATENT NO. : 4,292,813
DATED : October 6, 1981
INVENTOR(S) : STEPHEN W. PADDOCK

It is certified that error appears in the above–identified patent and that said Letters Patent are hereby corrected as shown below:

Column 12, line 1 (Claim 12, line 3) after "stored", cancel "means" and substitute therefor --measure--.

Signed and Sealed this

Second Day of February 1982

[SEAL]

Attest:

Attesting Officer

GERALD J. MOSSINGHOFF
*Commissioner of Patents and Trademarks*